US008085182B2

(12) United States Patent
Kauffman

(10) Patent No.: US 8,085,182 B2
(45) Date of Patent: Dec. 27, 2011

(54) SYSTEMS AND METHODS FOR COLLECTING WEATHER INFORMATION USING AN AIRBORNE AIRCRAFT

(75) Inventor: Donald C. Kauffman, Laurel, MD (US)

(73) Assignee: Honeywell International Inc., Morristown, NJ (US)

( * ) Notice: Subject to any disclaimer, the term of this patent is extended or adjusted under 35 U.S.C. 154(b) by 234 days.

(21) Appl. No.: 12/415,686

(22) Filed: Mar. 31, 2009

(65) Prior Publication Data
US 2010/0245164 A1 Sep. 30, 2010

(51) Int. Cl.
*G01S 13/00* (2006.01)
(52) U.S. Cl. .................. 342/26 B; 342/26 R; 342/26 D; 342/58
(58) Field of Classification Search ................. 342/26 R, 342/26 A, 26 B, 26 C, 26 D, 58
See application file for complete search history.

(56) References Cited

U.S. PATENT DOCUMENTS

| | | | |
|---|---|---|---|
| 4,667,199 A | | 5/1987 | Roberts |
| 5,051,750 A | * | 9/1991 | Hollister .................. 342/26 D |
| 5,077,558 A | * | 12/1991 | Kuntman .................. 342/26 B |
| 5,175,551 A | * | 12/1992 | Rubin ........................ 342/26 D |
| 5,363,107 A | * | 11/1994 | Gertz et al. ............... 342/26 B |
| 5,379,215 A | * | 1/1995 | Kruhoeffer et al. ............... 702/3 |
| 5,392,048 A | | 2/1995 | Michie |
| 5,657,009 A | * | 8/1997 | Gordon ......................... 340/968 |
| 6,018,307 A | | 1/2000 | Wakayama et al. |
| 6,043,756 A | * | 3/2000 | Bateman et al. ............... 340/945 |
| 6,201,494 B1 | * | 3/2001 | Kronfeld ..................... 342/26 R |
| 6,501,392 B2 | * | 12/2002 | Gremmert et al. ............ 340/971 |
| 6,535,817 B1 | | 3/2003 | Krishnamurti |
| 6,597,305 B2 | * | 7/2003 | Szeto et al. .................. 342/26 R |
| 6,650,972 B1 | * | 11/2003 | Robinson et al. .................. 701/3 |
| 6,690,317 B2 | * | 2/2004 | Szeto et al. .................. 342/26 R |
| 6,828,922 B1 | * | 12/2004 | Gremmert et al. ............ 340/949 |
| 6,879,280 B1 | | 4/2005 | Bull et al. |
| 6,882,302 B1 | * | 4/2005 | Woodell et al. ............. 342/26 R |
| 6,977,608 B1 | * | 12/2005 | Anderson et al. ........... 342/26 B |
| 7,027,898 B1 | * | 4/2006 | Leger et al. ..................... 701/14 |
| 7,039,505 B1 | | 5/2006 | Southard et al. |
| 7,109,912 B1 | | 9/2006 | Paramore et al. |
| 7,109,913 B1 | * | 9/2006 | Paramore et al. ........... 342/26 B |
| 7,129,885 B1 | | 10/2006 | Woodell et al. |

(Continued)

FOREIGN PATENT DOCUMENTS
WO 99/40457 8/1999

OTHER PUBLICATIONS

Chris Fogarty et al., Numerical Modeling of Atlantic Hurricanes Moving Into the Middle Latitudes, Dalhousie University, Meteorological Service of Canada, Canadian Hurricane Centre, 4A.2, Http://projects.novaweather.net/work.html, Apr. 24, 2006.

(Continued)

*Primary Examiner* — Thomas Tarcza
*Assistant Examiner* — Peter Bythrow
(74) *Attorney, Agent, or Firm* — Lowe Graham Jones PLLC

(57) ABSTRACT

Weather information recording systems and methods are operable to record information detected by airborne aircraft. An exemplary embodiment generates a trigger event corresponding to the presence of weather of interest, stores weather information collected by an aviation electronics system in a memory in response to generating the trigger event, and downloads the stored weather information to a remote memory.

20 Claims, 4 Drawing Sheets

U.S. PATENT DOCUMENTS

| | | | |
|---|---|---|---|
| 7,205,928 B1* | 4/2007 | Sweet | 342/26 B |
| 7,352,317 B1 | 4/2008 | Finley et al. | |
| 7,353,690 B2 | 4/2008 | Solheim et al. | |
| 7,365,674 B2 | 4/2008 | Tillotson et al. | |
| 7,365,675 B2 | 4/2008 | Pearlman et al. | |
| 7,379,816 B2 | 5/2008 | Southard et al. | |
| 7,417,579 B1* | 8/2008 | Woodell | 342/26 B |
| 7,471,234 B1 | 12/2008 | Lang | |
| 7,486,219 B1* | 2/2009 | Woodell et al. | 342/26 B |
| 7,724,177 B2* | 5/2010 | Bunch et al. | 342/26 R |
| 7,817,078 B2* | 10/2010 | Bunch | 342/26 B |
| 2002/0039072 A1* | 4/2002 | Gremmert et al. | 340/945 |
| 2002/0098800 A1* | 7/2002 | Frazita et al. | 455/12.1 |
| 2003/0016156 A1* | 1/2003 | Szeto et al. | 342/26 |
| 2004/0183695 A1* | 9/2004 | Ruokangas et al. | 340/945 |
| 2008/0158049 A1* | 7/2008 | Southard et al. | 342/26 R |
| 2008/0208474 A1* | 8/2008 | Wilson | 702/3 |

OTHER PUBLICATIONS

Chris Fogarty, Aircraft Data From Rapidly-Moving Hurricane Juan South of Nova Scotia, Canadian Hurricane Centre, 5D.5, Http://nivaweather.net/Hurricane Juan.html, Sep. 24, 2003.

Donald C. Kauffman et al., Systems and Methods for Assessing Weather in Proximity to an Airborne Aircraft, U.S. Appl. No. 12/415,704, filed Mar. 31, 2009.

* cited by examiner

SYSTEMS AND METHODS FOR COLLECTING WEATHER INFORMATION USING AN AIRBORNE AIRCRAFT

BACKGROUND OF THE INVENTION

An aircraft weather radar system emits a pulsed signal, or a series of pulsed signals, in a predefined direction (azimuth) from its antenna. When the pulsed signal is incident on weather that lies along the direction of the emitted pulsed signal, a portion of the pulsed signal is reflected back from precipitation within the weather. The radar antenna detects the returned radar signal. Analysis of the received radar signal permits determination of the distance, or range, of the weather from the radar system.

The intensity of the reflectivity information in the received radar signal may be used to determine characteristics of the weather. Reflectivity information is determined as the result of the processing of raw radar return data. Reflectivity information may include normalized return power estimates, return level statistics such as standard deviation, variance, autocorrelation and higher order moments and Doppler frequency statistics such as mean value, standard deviation, variance and other higher order moments. The processed reflectivity information may be referenced as a function of location, either relative to aircraft position or with respect to earth coordinates, and/or may be referenced as a function of altitude, either relative to the aircraft or with respect to the earth. A relatively weak intensity may be associated with light precipitation, such as a light rain or the like. A relatively stronger intensity may be associated with heavier precipitation, such as a heavy rain or the like. And, a very strong intensity may be associated with very heavy precipitation that may present a hazard to the aircraft.

The aircraft weather radar system processes the received data and presents an image corresponding to the weather to the crew on a display. The display indicates the range of the weather by illustrating a plurality of range lines or the like on the display to indicate the relative position of the weather from the aircraft. A colored area displayed on the display indicates the lateral extent of the weather (width and depth of the detected weather).

Various color schemes may be used to indicate characteristics of the detected weather based upon the intensity of the received radar returns. For example, a green colored area may be used to indicate a region of relatively light precipitation (as determined by the relatively weak weather radar reflectivity intensities), a yellow colored area may be used to indicate a region of relatively heavy precipitation (as determined by the relatively stronger weather radar reflectivity intensities), and a red colored area may be used to indicate a region of very heavy, and potentially hazardous, precipitation (as determined by the very strong weather radar reflectivity intensities).

Some types of aircraft weather radar systems, and/or other weather detecting systems, may be able to detect turbulence and/or other types of weather. To indicate turbulence regions, another color such as magenta, may be superimposed on the image. Thus, the crew of the aircraft is able to identify the location of the turbulence relative to the aircraft, and adjust the planned flight path as needed to avoid weather that might be potentially hazardous to the aircraft.

However, the above-described aircraft weather radar systems are not particularly sophisticated in providing analyzed information to the crew. For example, radar intensities in the above example are categorized into three ranges; light, moderate, and heavy (thus generating the green, yellow, and red colored areas on the display). A fourth colored magenta area indicates turbulence. Thus, the aircraft's electronic system applies a relatively simple weather model to analyze the received data. Here, the weather model may be categorized as parsing the weather information into one of five categories (wherein no radar return intensity is shown as a black region, wherein a weak radar return intensity corresponding to relatively light precipitation is shown as a green region, wherein a moderate radar return intensity corresponding to relatively heavy precipitation is shown as a yellow region, wherein a very strong radar return intensity corresponding to potentially hazardous precipitation is shown as a red region, and wherein turbulence is shown as a magenta region).

Further, such simplistic weather models used by such aircraft weather radar systems may not always present the most reliable and useful information to the crew. Characteristics of weather are known to vary based upon geographic location. For example, a storm cell over the Rocky Mountains is quite different from a storm cell over Kansas or the Pacific ocean. Yet the conventional aircraft weather radar system is not able to differentiate between characteristics of the storm based on geography. The conventional aircraft weather radar system simply presents colored regions on the display corresponding to the detected intensity of the received radar returns.

Some aircraft weather radar systems are configured to adjust the intensity ranges of the received radar returns to account for different geographies. For example, U.S. Pat. No. 7,486,319 to Woodell et al., which is incorporated herein by reference in its entirety, adapts the aircraft weather radar system in accordance with a seasonal parameter, a time-of-day parameter, or a location parameter. Radar returns are normalized depending on the environment in which it is detected.

However, the nature of the weather model in the U.S. Pat. No. 7,486,319 to Woodell et al. remains relatively simple. For example, the crew will not be able to immediately discern weather or not the storm cell is growing or decaying by viewing the radar system display. The crew will have to observe the displayed image on their radar system over some period of time to discern such changes in the weather. This requires the crew to periodically observe the radar display, thus increasing the "heads down time" of the crew.

Further, based upon experience, the crew may suspect that there is lightning, hail or the like in the weather. Subjectively interpreting the radar images by the crew increases the "cognitive work load" placed on the crew.

Based on their interpretation of the radar images, the crew may elect to alter their flight plan to avoid weather that they think may be potentially hazardous. The deviation from the flight plan typically adds additional air time and mileage to travel to the destination, thus increasing fuel costs. However, even though the radar image led the crew of the aircraft to conclude that the weather was potentially hazardous, it may be that the weather was, in fact, not hazardous and was safe to travel through.

It would be desirable to provide an improved aircraft weather radar system that increases the crew's "heads up" time and decreases the crew's "cognitive work load." That is, it would be desirable to provide the crew more time to view where they are going and/or to allow the crew to concentrate on other matters. Further, it is desirable to avoid unnecessary flight plan deviations around weather that is not actually hazardous.

SUMMARY OF THE INVENTION

Systems and methods of detecting weather and storing the detected weather information using an airborne aircraft are disclosed. An exemplary embodiment generates a trigger event corresponding to the presence of weather of interest, stores weather information collected by an aviation electronics system in a memory in response to generating the trigger event, and downloads the stored weather information to a remote memory.

In accordance with further aspects, an exemplary embodiment has at least one weather sensor, a processing system communicatively coupled to the at least one weather sensor, and an onboard memory that stores the determined weather information in response to a trigger event generated in response to the weather information exceeding a predefined threshold.

BRIEF DESCRIPTION OF THE DRAWINGS

Preferred and alternative embodiments are described in detail below with reference to the following drawings.

DETAILED DESCRIPTION OF THE PREFERRED EMBODIMENT

Figure 1A:
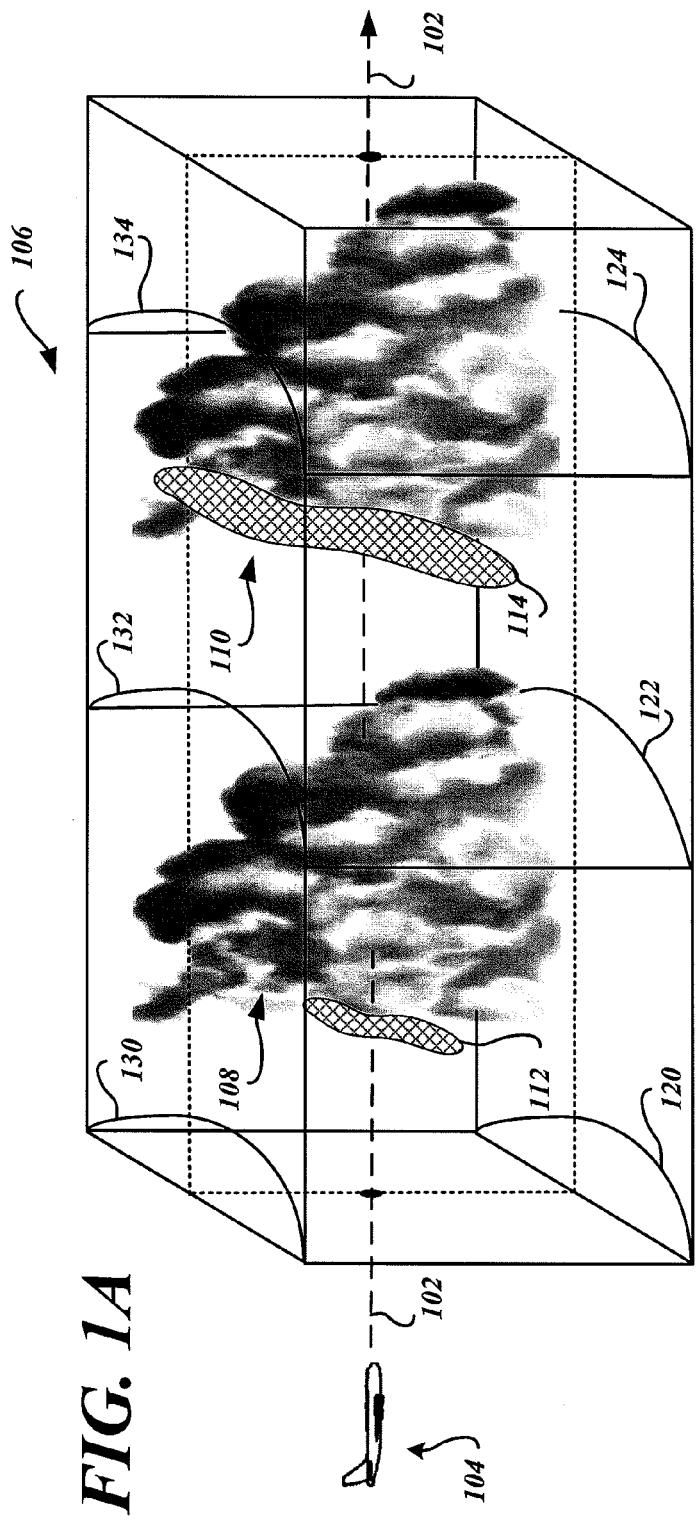
FIG. 1A is a perspective view of a portion of a planned flight path of an airborne vehicle through a region of space having radar-detectable weather.
Figure 1B:
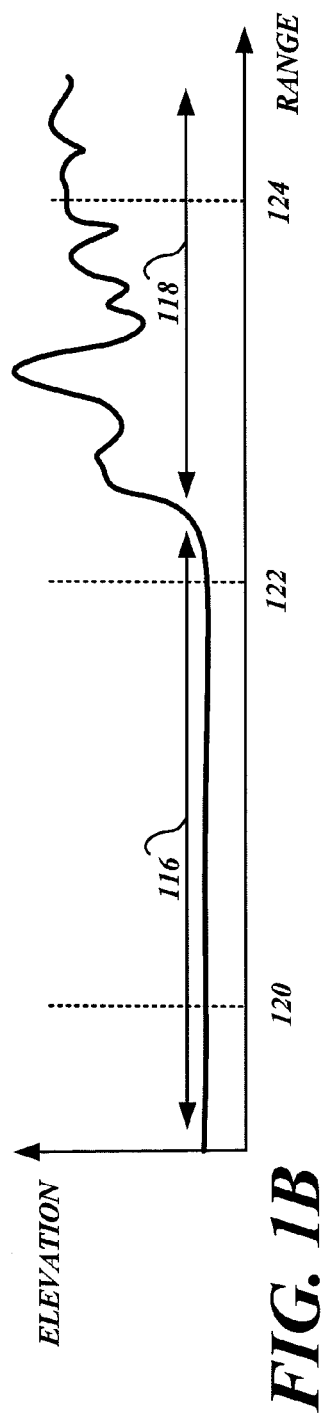
FIG. 1B is a profile view along the planned flight path of the airborne vehicle.

FIG. 1A is a perspective view of a portion of a planned flight path 102 of an airborne vehicle, such as an aircraft 104 or the like, through a region of space 106 having radar-detectable weather, such as the two storm cells 108, 110. FIG. 1B is a profile view along the planned flight path of the aircraft 104. Here, the aircraft 104 will be traversing through weather that is over very different geographies. The aircraft 104 may commercially transport goods and/or people. The term "weather" generally refers to any type of weather radar detectable weather phenomena, such as, but not limited to, storm cells, turbulence regions, lightning, precipitation, hail, snow, wind shear, icing conditions, and the like that the aircraft 104 may encounter.

Associated with each storm cell 108, 110, in this illustrative example, is a turbulence region 112, 114, respectively. The illustrated turbulence region 112 resides along the front side of the storm cell 108 and generally lies along the flight path 102. Similarly, the illustrated turbulence region 114 resides along the front side of the storm cell 110 and also generally lies along the flight path 102. The turbulence regions 112, 114 are conceptually illustrated as cross-hatched regions for delineation from the storm cells 108, 110.

The profile view of FIG. 1B illustrates a hypothetical ground profile below the region of space 106 that lies along the planned flight path 102. The ground profile view conceptually illustrates that the planned flight path 102 is currently traversing a flat ground surface 116 characterized by a generally low elevation. Then, the profile view conceptually illustrates that the planned flight path 102 will traverse a range of mountains 118 characterized by relatively high elevations.

Various range distances 120, 122, 124 out from the aircraft 104 are also illustrated on both the perspective view of FIG. 1A and the profile view of FIG. 1B. These distances 120, 122, 124 indicate the range (relative distance) of the storm cells 108, 110 and the turbulence regions 112, 114 from the aircraft 104.

The crew, when viewing the storm cells 108, 110, would have difficulties discerning differences between the storm cells 108, 110 because the storm cells 108, 110 appear very similar. For example, the altitude, the height, and the width of the storm cells 108, 110 appear to be very similar. A conventional radar system would likely generate images of the storm cells 108, 110 which look quite similar.

Even if the conventional radar system is configured to adjust the received radar returns to account for different geographies, such as in the above-described U.S. Pat. No. 7,486,319 to Woodell et al., which adapts the aircraft weather radar system in accordance with a seasonal parameter, a time-of-day parameter, or a location parameter, the nature of the displayed radar images will still be relatively similar. The storm cells 108, 110 will likely have the same area. Both of the radar images of the storm cells 108, 110 will have regions colored green (indicating relatively light precipitation), yellow (indicating relatively heavy precipitation) and red (indicating very heavy, and potentially hazardous, precipitation). If turbulence is detectable, magenta areas may be displayed. That is, the displayed radar image for the storm cells 108, 110 may fail to impart to the crew that the storm cell 110 is likely to be potentially hazardous. Further, the crew will not know if the storm cells 108, 110 are growing, if they are decaying, how fast they are moving, and other information of interest.

Turbulence is not a visible weather phenomena, and thus cannot be seen by the crew of the aircraft 104. Accordingly, the crew of the aircraft 104 is not able to visually identify the presence of the turbulence regions 112, 114. Thus, the presence of turbulence will not be known until after the aircraft 104 has entered the turbulence regions 112, 114. Depending upon the severity of the turbulence, the crew may be forced to take reactive measures to get through the turbulence or to get away from the turbulence.

Even if the turbulence is detectable by the aircraft's electronic weather detection systems, the severity and/or extent of the turbulence may not be readily determinable with a high degree of accuracy. Thus, the aircraft's electronic weather detection systems may not be able to advise the crew of the severity and/or the extent of the turbulence regions 112, 114 (until after the aircraft 104 has entered the turbulence regions 112, 114).

In some situations, the experience of the crew will provide them a sense of whether the visible storm cells 108, 110 have, or are near to, potentially hazardous turbulence regions. One factor that influences the nature of weather is the characteristics of the ground below the weather. In the example above, the storm cells 108, 110 are likely to be associated with quite different levels of turbulence, in part, because of the differences in terrain which the storm cells 108, 110 are over.

For example, the storm cell 108 is above the relatively flat, low elevation ground surface 116. Accordingly, the experience of the crew may lead them to believe that the storm cell 108 is a non-convective cell that is probably safe to traverse through, even if the displayed radar image indicates red areas associated with very heavy precipitation. In contrast, the storm cell 110 is likely to be very different since the storm cell 110 is interacting with the mountains. The experience of the crew may lead them to believe that the turbulence in the vicinity of the storm cell 110 may be more severe. However, the crew of the aircraft may not have correctly interpreted the nature of the storm cells 108, 110 based on radar return information provided by the aircraft's electronic weather detection systems.

Figure 2:
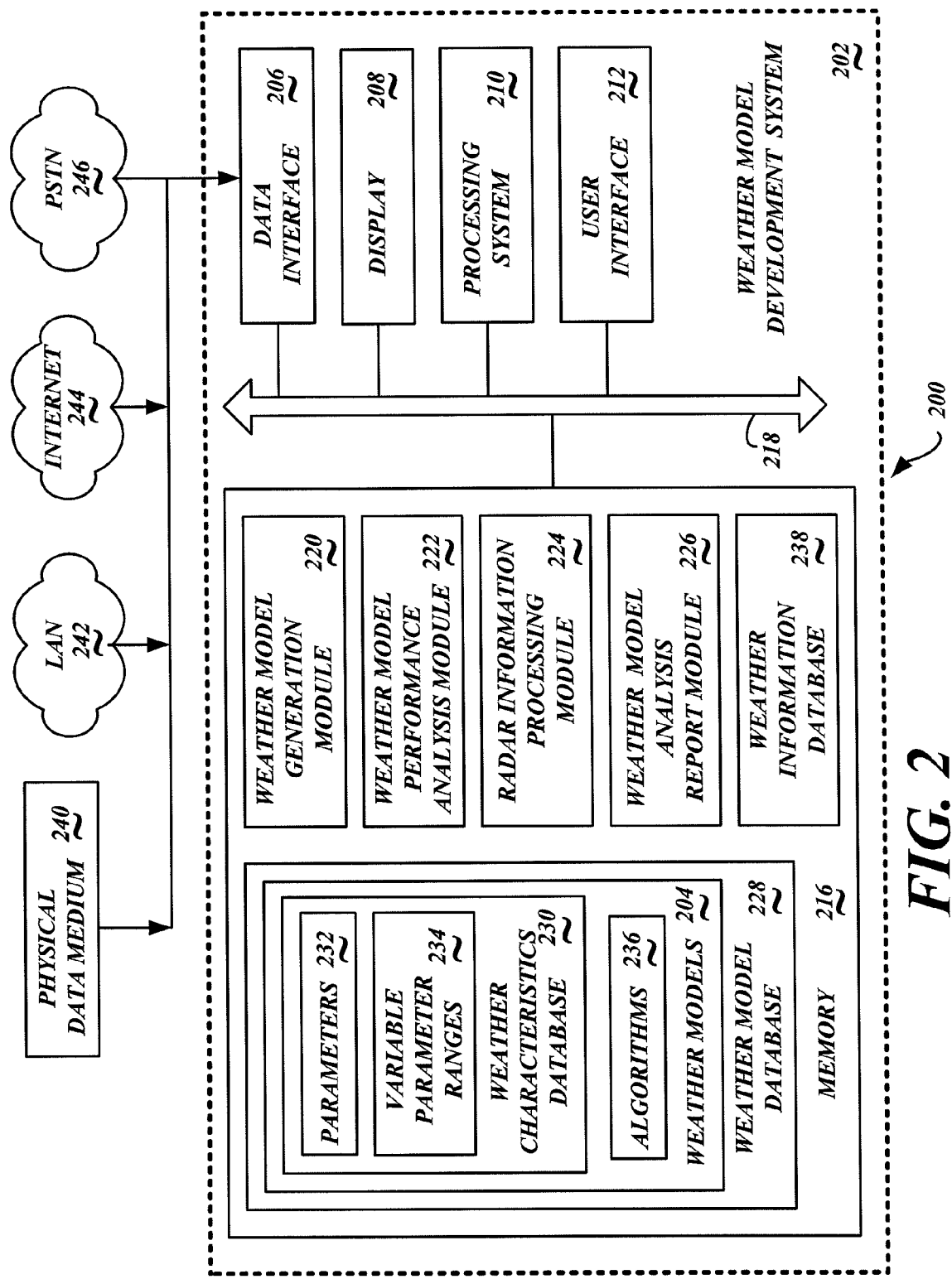
FIG. 2 is a block diagram of an embodiment of the dynamic weather model system implemented in a weather model development system.

FIG. 2 is a block diagram of an exemplary embodiment of the dynamic weather model system 200 implemented in a weather model development system 202. Embodiments of the dynamic weather model system 200 generate a plurality of weather models 204 representing different types of weather that the aircraft 104 is likely to encounter. Further, based on accumulated field data and observations, the weather models 204 are analyzed and verified so that the weather models 204 evolve to more accurately represent weather typically encountered by the aircraft 104. Embodiments of the dynamic weather model system 200 may be installed in commercial aircraft, for example.

Many types of weather models 204 are employed by embodiments of the dynamic weather model system 200. The weather models 204 correspond to the various types of weather that the aircraft 104 (FIG. 1) is likely to encounter while airborne. Weather models may be relatively simple, such as a model of the physical dimensions of a storm (such as storm height, storm width, and/or storm altitude). Other weather models may be relatively complex and model many characteristics of the weather (turbulence, precipitation, growth rates, speed and/or direction movement, etc.).

An exemplary weather model 204 may, for example, correspond to a winter storm over the Rocky Mountains. Another non-limiting example of a weather model 204 may correspond to a summer storm approaching Florida from the Gulf of Mexico. It is appreciated that the various weather models 204 may correspond to many different types of weather (lightning storms, rain clouds, hurricanes, tornadoes, non-convective weather, convective weather, etc.) Further, the weather models 204 may additionally, or alternatively, correspond to geography. That is, a particular weather model may correspond to a geographic location where the modeled weather is likely to be encountered by the airborne aircraft 104. As noted above, some weather models 204 may correspond to a season and/or a time-of day that the modeled weather is likely to be encountered by the airborne aircraft 104.

Aircraft 104 equipped with embodiments of the dynamic weather model system 200 routinely collect field data and observations concerning the weather that the aircraft 104 travels through during its regular flight schedule. With many aircraft 104 equipped with the dynamic weather model system 200, a large amount of weather information is collected and saved over time. The field data and observations are then sent to a central repository for analysis by the weather model development system 202.

The weather models 204, which are based upon the collected field data and observations of actual weather, are used to predict characteristics of weather that the aircraft 104 is likely to encounter while in flight. For example, it the aircraft 104 is approaching a particular type of storm (over a specific type of geography, during a particular season of the year, and/or at a specific time of day), the dynamic weather model system 200 conducts an analysis to determine if there is likely to be any predictable hazardous conditions, such as nearby turbulence (which cannot seen by the crew). That is, for example, the weather information currently collected by the aircraft 104 is input into a weather model 204 such that the analysis predicts the presence of any potentially hazardous turbulence.

The exemplary weather model development system 202 includes a data interface 206, an optional display 208, a processing system 210, a user interface 212, and a memory 216. It is appreciated that the weather model development system 202 may include other components and/or systems that are not illustrated or described herein.

The above-described components, in an exemplary embodiment, are communicatively coupled together via communication bus 218. In alternative embodiments, the above-described components may be communicatively coupled to each other in a different manner. For example, one or more of the above-described components may be directly coupled to the processing system 210, or may be coupled to the processing system 210 via intermediary components (not shown). In some embodiments, the above described components may be separately implemented in separate devices that may have other functions.

An exemplary embodiment of the dynamic weather model system 200 comprises a plurality of cooperatively acting modules. The modules are identified as a weather model generation module 220, a weather model performance analysis module 222, a radar information processing module 224, and an optional weather model analysis report module 226. Modules 220, 222, 224, 226 reside in the memory 216, and are retrieved and executed by the processing system 210. In other embodiments, the modules 220, 222, 224, 226 may be implemented together as a common module, may be integrated into other modules, or reside in other memories (not shown).

A weather model database 228 is stored in memory 216. In an exemplary embodiment, the weather model database 228 includes a plurality of the weather models 204 corresponding to various types of weather. The weather model database 228 (or portions thereof) may be implemented with other databases, may be implemented in various formats, such as a buffer or the like, and/or may be implemented in another memory.

The weather models 204 are defined using weather characteristics database 230 (having a plurality of parameters 232 and variable parameter ranges 234 residing therein) and algorithms 236. The parameters 232 correspond to a quantity, or value, that characterizes the modeled weather. The variable parameter ranges 234 correspond to variable range of values characterizing the modeled weather. Thus, the variable parameter range 234 is defined by an upper variable range value and a lower variable range value. The algorithms 236 mathematically model and/or analyze the weather based upon specified parameters 232 and variable parameter ranges 234.

Some algorithms 236 model physical characteristic of the weather. For example, storm cell height may impact a corresponding variable parameter range 234 that is used to model intensity and/or type of turbulence nearby or within the storm cell. As another example, weather may be characterized by its vertically integrated liquid (VIL) water content metric. The VIL water content metric for a particular region of the storm cells 108, 110 is determined from analysis of radar returns. The VIL water content metric can vary as a function of the height, width, and/or depth.

Other algorithms model temporal changes in a variable parameter range 234 as a function of time. For example, if a storm cell is modeled as growing at some particular rate, then one or more of the variable parameter ranges 234 will change as a function of time. If the storm cell is modeled at a particular time of day, then some algorithms 236 may vary the variable parameter ranges 234 depending upon the length of time of the weather model analysis.

Another exemplary parameter 232 is a geographic location that correlates attributes of weather based on geographic location. As noted above, the nature of weather may be a function of the geography over which the weather lies. For example, storm cells over the ocean are quite different from storm cells over mountains or flat land, even if they look similar to a viewer and/or if they generate similar radar returns. The geographic location parameter 232 is defined using a latitude and a longitude. Thus, this parameter 232 may be used to select a particular one of the weather models 204.

Another exemplary parameter 232 is a time-of-day that correlates attributes of weather based on the analyzed time of the day. For example, in the morning, weather over the Rocky Mountains tends to grow in the morning as ground moisture evaporates when the sun increases air temperature. In the late afternoon, weather over the Rocky Mountains tends to decay as the air above the mountain cools. Thus, this time-of-day parameter 232 may be used to select a particular one of the weather models 204.

Another exemplary parameter 232 is a season of the year. A summer storm cell approaching Florida from the Gulf of Mexico is quite different from a storm cell in the winter. Thus, this seasonal parameter 232 may also be used to select a particular one of the weather models 204.

An exemplary variable parameter range 234 is the VIL water content metric determined from radar returns. Threshold values for the VIL water content metric, stored as parameters 232, are used to characterize weather. When a value for the VIL water content metric variable parameter range 234 is input into an algorithm 236 modeling VIL water content metrics, comparison of the modeled VIL water content metric values with the VIL water content metric thresholds may be used to define which type of weather model 204 is best suited for predicting weather characteristics.

Another exemplary variable parameter range 234 is the ambient temperature sensed by the aircraft 104. Another exemplary variable parameter range 234 is the humidity sensed by the aircraft 104. Threshold values for the ambient temperature and/or humidity, stored as parameters 232, are used to characterize weather. For example, storm cells behave quite differently on a very hot, humid summer day as compared to a storm cell on a relatively cooler, and drier, summer day. Thus, once values for the ambient temperature and/or humidity variable parameter ranges 234 are provided, the ambient temperature and/or humidity related algorithm 236 of a selected weather model 204 can be used for predicting weather characteristics.

Other variable parameter ranges 234 may be used to analyze characteristics and/or attributes of a weather model 204. Other variables include, but are not limited to, the height, the width, and/or the depth of the weather. Radar return intensities may also provide values for one or more variable parameter ranges 234. Direction of movement, accelerations, speed, and other time related characteristics of the weather may be determined from radar return information. Characteristics of the aircraft 104 may also provide values for one or more variable parameter ranges 234. For example, the magnitude of a sensed abrupt vertical acceleration of the aircraft 104 may be used as a turbulence value.

Non-limiting examples of the algorithms 236 include weather growth rate models, weather decay rate models, precipitation intensity models, turbulence models (intensity and/or direction), weather movement models (speed and/or direction), or the like. It is appreciated that any devised algorithm 236 may be used to model the characteristics of a particular type of weather that is modeled by a weather model 204.

The weather models 204 are based upon observed weather and collected field data. Weather information characterizing observed weather is saved into the weather information database 238. Observed weather information (i.e., radar return data and inertial measurement instrumentation data) may be accumulated by the electronic weather detection systems of the aircraft 104 passing through or near a particular type of weather. Weather observations may also be input by the crew of the aircraft. Weather information collected by remote sources, such as a ground radar station or meteorological station, may also be collected as stored into the weather information database 238.

For example, an aircraft 104 travelling over the Rocky Mountains in January may collect information characterizing an observed winter storm. The weather information collected by the aircraft 104 is saved into the weather information database 238. For example, the radar return intensity information collected by the aircraft 104 is saved into the weather information database 238. Additionally, the location, time-of-day, and seasonal parameters for the observed winter storm are saved into the weather information database 238. Observations of the storm height, width, depth, speed of movement (which was likely changing over time) may also be stored into the weather information database 238.

As another example, information characterizing an observed summer storm approaching Florida from the Gulf of Mexico may be saved into the weather information database 238. Over time, information characterizing observed weather may be saved for many different types of observed weather.

The observed weather information also includes, but is not limited to, turbulence intensity information, observed growth and/or decay rates of the weather, temperature information, observed precipitation levels (rain, snow, and/or hail), observed lightning frequency rates, observed direction and/or speed of movement of the weather, observed physical geometries of the weather (height, width, depth, etc.). Further, the above-described information may include information identifying "where" in the weather the observed characteristic was located. For example, the temperature at the top of a storm cell is likely to be different from the temperature at the bottom of the storm cell.

Furthermore, for any particular type of weather, weather information for many similar weather types may be stored into the weather information database 238. For example, weather information for tens, or even hundreds, of observed summer storms approaching Florida from the Gulf of Mexico may be saved into the weather information database 238.

The weather information is delivered to the weather model development system 202 via the data interface 206. The data interface 206 is operable to receive data input from a variety of mediums, including a physical data medium 240, a local area network (LAN) 242, the Internet 244, or a public switched telephony system (PSTN) 246. The data interface 206 may also include a transceiver (not shown) for receiving wireless signals.

As noted above, the weather algorithms 236 for any particular weather model 204 mathematically characterize the relationships between the various types of variable parameter ranges 234 used in the weather model 204. To analyze weather, a set of weather information values, analyzed or observed, is loaded into the parameters 232 and the variable parameter ranges 234 for a selected weather model 204. Then, the weather algorithms 236 are executed for the selected weather model 204 using the input values of the weather parameters 232 and variable parameter ranges 234. Based upon the analysis result, various characteristics and/or attributes of the analyzed type of weather represented by the selected weather model 204 may be evaluated.

Analysis of weather may be used in a variety of manners. For example, weather analysis may be used by the weather model performance analysis module 222 to assess validity of a particular weather model 204. That is, based upon observed information provided by the aircraft 104, a selected one of the weather models 204 may be used to analyze the observed weather information. A good match between the analysis and the observed weather information would indicate that the selected weather model 204 was valid. Discrepancies between the analyzed weather model 204 and the observed weather information might indicate that a wrong weather model 204 was selected for the analysis, or indicate that the selected weather model 204 may require modification.

If the selected weather model 204 requires modification, the weather model generation module 220 may be executed to determine improvements in the weather algorithms 236. If there is no applicable weather model 204 which accurately analyzes the observed weather that the aircraft 104 has passed through or near to, the weather model generation module 220 may be executed to generate a new weather model 204. Alternatively, weather models 204 may be manually changed or added by a programmer.

In some embodiments, the weather model generation module 220 is implemented as a neural network and/or as artificial intelligence. Thus, the weather algorithms 236 may be automatically modified, and/or new weather models may be automatically created, based upon the inherent intelligence and learning functions in a neural network-based or an artificial intelligence-based weather model generation module 220. For example, after analyzing several observed summer storms approaching Florida from the Gulf of Mexico, a trending of VIL water content metrics for similar storms may be observed by the weather model generation module 220 is implemented as a neural network and/or as artificial intelligence. Accordingly, the parameters 232 that define various VIL water content metric thresholds may be modified so that the weather model 204 better corresponds to the characteristics of the observed summer storms.

In some embodiments, one or more weather hazards may be predicted based upon from the results of the weather analysis. Accordingly, appropriate warnings or advisories may then be devised to indicate the predicted weather hazard. For example, a weather model 204 modeling a winter storm over the Rocky Mountains may indicate that the leading edge of the winter storm may be expected to have very severe, and even potentially hazardous, turbulence regions. Accordingly, embodiments of the dynamic weather model system 200 would, based upon the predicted occurrence of the turbulence, generate an appropriate warning or advisory that identifies the expected occurrence of the turbulence.

The weather model analysis report module 226 prepares various types of output reports. Such output reports may be presented to a user on the display 208. Additionally, or alternatively, the output reports may be sent to a printer for printing or saved into the memory 216 (or another suitable memory medium). Additionally, or alternatively, the output reports may be sent to the physical data medium 240 for storage, and/or sent to another memory, printer, and/or display via the LAN 242, the Internet 244, or the PSTN 246.

Figure 3:
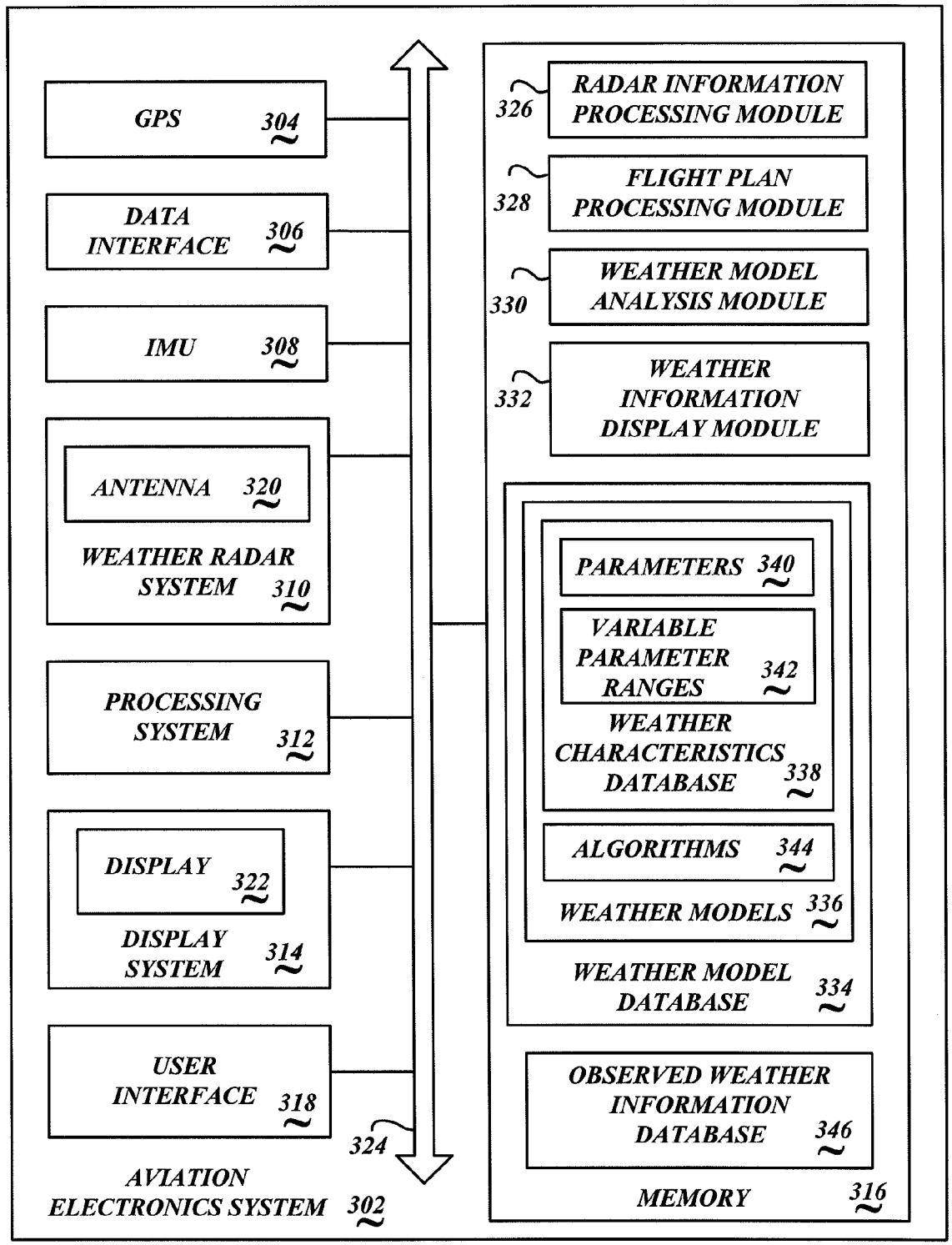
FIG. 3 is a block diagram of an exemplary embodiment of the dynamic weather model system implemented in an aviation electronics system of the aircraft.

FIG. 3 is a block diagram of an exemplary embodiment of the dynamic weather model system 200 implemented in an aviation electronics system 302 of the aircraft 104 (FIG. 1). When the dynamic weather model system 200 is implemented in the aircraft 104, a plurality of weather models 204 may be analyzed based upon the received radar return information and other information, such as, but not limited to, the known location of the aircraft 104, seasonal information, and/or time-of-day information. The weather analysis may then be used to determine the type of, and/or to predict characteristics of, the detected weather.

While the aircraft 104 is in flight, the onboard embodiments of the dynamic weather model system 200 are able to differentiate between convective and non-convective storm cells based upon real time information collected by the aviation electronics system 302. As another example, embodiments of the dynamic weather model system 200 are able to predict whether the detected weather is growing or decaying. Further, embodiments of the dynamic weather model system 200 are able to predict speed and/or direction of movement of the detected weather. Also, embodiments of the dynamic weather model system 200 are able to predict the presence of dangerous conditions such as hail, lightning or severe turbulence that are likely to be within and/or nearby the detected weather. Some embodiments generate suitable warnings and/or advisories to the crew when potentially hazardous conditions are predicted. Thus, it is appreciated while the aircraft 104 is in flight, the onboard embodiments of the dynamic weather model system 200 provide the crew better information characterizing nearby weather, thus reducing crew's "heads down" time and decreasing the crew's "cognitive work load." Accordingly, the crew of the aircraft 104 has more time to view where they are going and/or to concentrate on other matters. Further, the enhanced information provided by the dynamic weather model system 200 may allow the crew to avoid unnecessary flight plan deviations around weather that is not actually hazardous.

The aviation electronics system 302 includes a global positioning system (GPS) 304, a data interface 306, an inertial measurement unit (IMU) 308, a weather radar system 310, a processing system 312, a display system 314, a memory 316, and a crew interface 318. The weather radar system 310 includes an antenna 320 that is operable to emit radar signals and receive radar returns. The display system 314 includes a display 322. It is appreciated that the aviation electronics system 302 includes many other components and/or systems that are not illustrated or described herein.

The above-described components, in an exemplary embodiment, are communicatively coupled together via a communication bus 324. In alternative embodiments of the aviation electronics system 302, the above-described components may be communicatively coupled to each other in a different manner. For example, one or more of the above-described components may be directly coupled to the processing system 312, or may be coupled to the processing system 312 via intermediary components (not shown).

The weather radar system 310 may be any suitable radar system, such as, but not limited to, a weather radar system that is operable to detect weather that is located in proximity to the aircraft 104. The antenna 320 is operable to emit radar pulses and to receive corresponding radar returns reflected back to the radar antenna 320 from the nearby weather. The antenna 320 is swept in a back-and-forth motion, in an up and down direction, and/or in other directions of interest, such that the weather radar system 310 is able to determine the location (bearing, elevation, and range) of the weather. Embodiments of the dynamic weather model system 200 may be implemented in other types and/or applications of radar, such as marine radar.

An exemplary embodiment of the dynamic weather model system 200 comprises a plurality of cooperatively acting modules. The modules are identified as a radar information processing module 326, a flight plan processing module 328, a weather model analysis module 330, and a weather information display module 332. The modules 326, 328, 330, 332 reside in the memory 316, and are retrieved and executed by the processing system 312. In other embodiments, the modules 326, 328, 330, 332 may be implemented together as a common module, may be integrated into other modules, or reside in other memories (not shown).

In an exemplary embodiment, a weather model database 334 is stored in memory 316. In an exemplary embodiment, the weather model database 334 includes a plurality of weather models 336 corresponding to various types of weather. The weather model database 334 (or portions thereof) may be implemented with other databases, may be implemented in various formats, such as a buffer or the like, and/or may be implemented in another memory.

The aircraft's weather model database 334 (with its plurality of weather models 336 that include the weather characteristics database 338, the associated weather parameters 340, the associated weather variable parameter ranges 342, and associated weather algorithms 344) corresponds to the previously generated weather model database 228 (with its plurality of weather models 204 having the weather model database 230, the associated weather parameters 232, weather variable parameter ranges 234, and weather algorithms 236). That is, a current weather model database 228 is transferred to and saved into the memory 316.

The weather model database 334 (with its plurality of weather models 336, associated weather parameters 340, weather variable parameter ranges 342, and weather algorithms 344) may be periodically updated with changes and/or additions that may be made by the weather model development system 202. The update information is downloaded or transferred to the memory 316 using the data interface 306 or using another suitable data transfer means.

The radar information processing module 326 processes radar returns detected by the antenna 320 of the weather radar system 310 while the aircraft 104 is in flight. In an exemplary embodiment, the radar information processing module 326 determines radar intensity information. The intensity of the radar return at a particular bearing, elevation, and range is stored as an intensity value at a corresponding range bin in the observed weather information database 346. In some embodiments, radar return intensity information is stored into a plurality of range bins, also referred to as voxels, of a three dimensional (3-D) weather information database 346.

Time stamps and other information of interest may also be included with the stored weather information. The time stamp allows data to be saved so as to create a four dimensional (4-D) temporal-space model so that information corresponding to changes over time in the detected weather can by analyzed and modeled.

When the aircraft 104 is airborne, the weather information display module 332 constructs a displayable image corresponding to the detected weather information. The displayable image is communicated to the display system 314 and is presented on the display 322.

During flight, the aircraft 104 detects any nearby weather. In response to detecting the weather, the dynamic weather model system 200 analyzes the weather. The weather analysis process begins by selecting one (or more) of the weather models 336 for analysis. Selection of a particular weather model 336 is based on a variety of factors (determinable parameter and variable values), such as location of the aircraft 104, seasonal information, and/or time-of-day information. For example, the current location of the aircraft 104 (and optionally the current date and time) is provided by the GPS 304. In alternative embodiments, other devices (not shown) provide location information, time-of-day information, and/or the current date. General characteristics of the detected weather, such as the width and/or height of the detected weather, may also be used to select a weather model 336 for analysis.

Once a weather model 336 has been selected for analysis, the received radar return information is input into the selected weather model 336. Other available information may also be used. The IMU 308 provides acceleration information that may be used to ascertain turbulence currently experienced by the aircraft 104. Other sensors (not shown) may provide ambient temperature information. Thus, the aviation electronics system 302 is collecting real time data and determining values for the parameters 340 and the variable parameter ranges 342.

Then, determined characteristics of the modeled weather are compared to the observed weather information to determine if the modeled weather 336 represents the observed weather with a reasonable degree of accuracy and/or reliability. If more than one weather model 336 has been analyzed, a best matching weather model 336 is selected.

Once a good match is found between an analyzed weather model 336 and the observed weather, the weather model 336 is further processed to predict characteristics that are likely to be associated with the observed weather. For example, returning to the example weather situation of FIG. 1, the storm cells 108, 110 are associated with the turbulence regions 112, 114, respectively. The best match weather model 336 is able to predict the existence of the turbulence region 112, 114.

For various reasons, the weather radar system 310 may not be able to detect turbulence near the detected weather. However, in view of the model analysis which has predicted turbulence, embodiments of the dynamic weather model system 200 generate a warning and/or an advisory indicating the predicted presence of the turbulence. For example, the predicted turbulence may be shown using magenta on the image generated by the weather information display module 332. Additionally, or alternatively, an alpha-numeric message indicating the predicted turbulence may be generated by the weather information display module 332 for display on the display 322.

Other characteristics of the detected weather may be predicted by embodiments of the dynamic weather model system 200. If the predicted weather characteristic is potentially hazardous (such as hail, lightning, or very heavy rainfall), then a suitable warning and/or advisory may be generated. Accordingly, the crew is made aware of the predicted weather characteristic.

Embodiments of the dynamic weather model system 200 may also predict other weather characteristics of interest. It is appreciated that the aviation electronics system 302 is detecting the weather for some discernable amount of time as the aircraft 104 is approaching the weather. Based upon the actual weather data collected over some period of time, and the selected weather model 336 analyzed, speed and direction of the movement of the detected weather may be predicted. Other changes in the nature of the detected weather may be predicted. For example, a prediction may be made as to whether the detected weather is growing or if the detected weather is decaying, and at what rates the growth or decay is expected to occur.

The flight plan processing module 328 processes flight plan information. The current flight plan of the aircraft 104 may be coordinated with the predicted characteristics of the detected weather. In some embodiments, the flight plan may be dynamically adjusted during flight based upon the predicted characteristics of the detected weather. For example, analysis of the detected weather may predict that there is likely to be hazardous turbulence in the weather. Accordingly, the flight plan processing module 328 may recommend a change in the current flight plan so as to avoid the weather.

Figure 4:
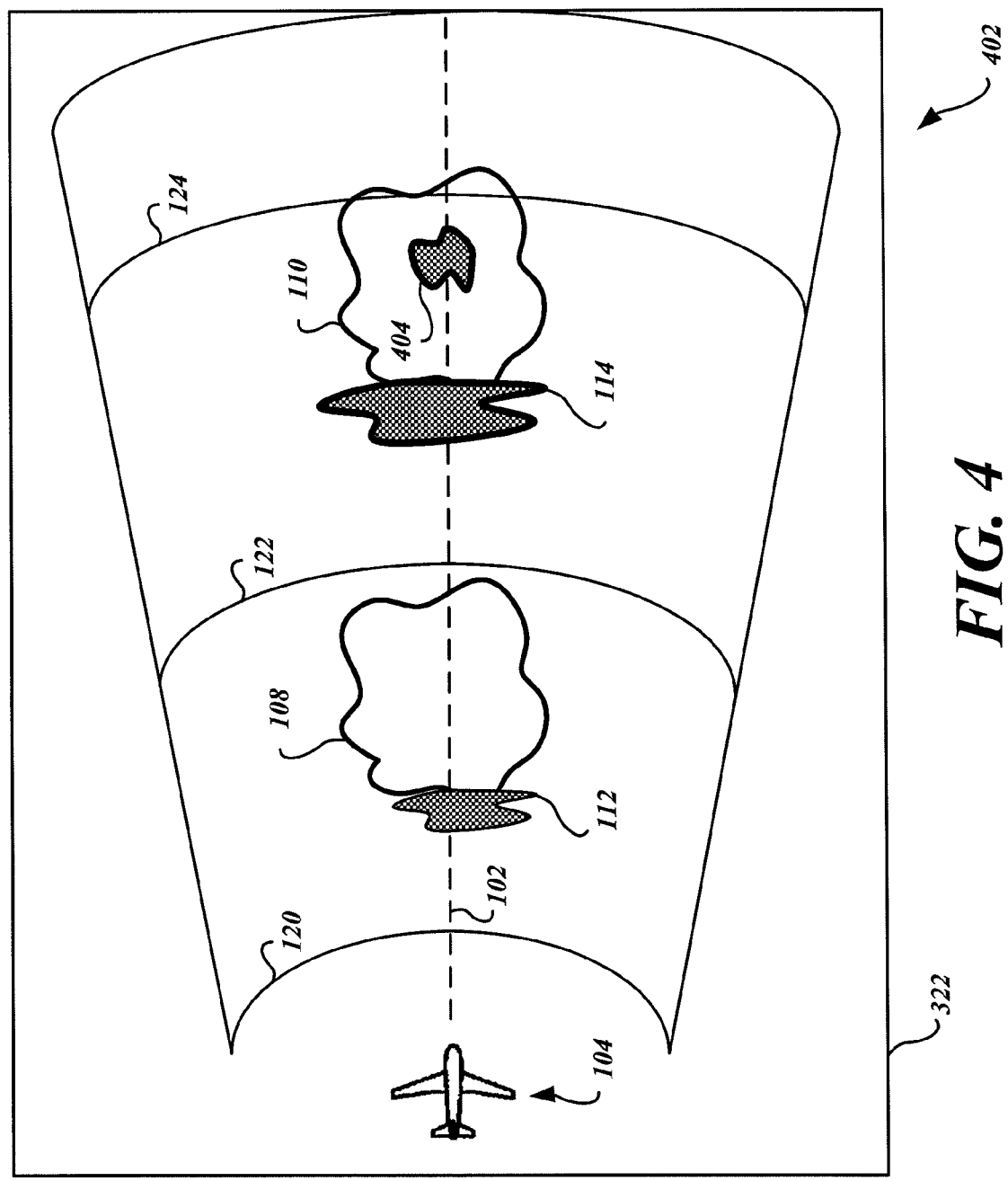
FIG. 4 is a radar image.

FIG. 4 is a hypothetical radar image 402 displayed on the display 322 of the aircraft 104. The radar image 402 presents a view of the planned flight path 102 through the above-described region of space 106 (FIG. 1) having two storm cell icons 108, 110 and turbulence region icons 112, 114. The storm cell icons 108, 110 and the turbulence region icons 112, 114 depict the relative location of the aircraft 104 on the radar image 402. An icon can be of fixed shape and/or size. Additionally, an icon can depict an arbitrarily shaped area with a distinctive pattern, color, and/or boundary that corresponds to the actual size of the weather-related phenomenon.

For convenience, the reference numerals of the storm cell icons 108, 110 are the same as the reference numerals used to identify the storm cells 108, 110 illustrated in FIG. 1. Similarly, the reference numerals of the turbulence region icons 112, 114 are the same as the reference numerals used to identify the turbulence regions 112, 114 illustrated in FIG. 1.

The storm cell icons 108, 110 indicate the lateral extents of their respective detected storm cells 108, 110. As noted above, the aircraft's aviation electronics system 302 may not be able to detect the turbulence regions 112, 114. However, the dynamic weather model system 200 may predict the existence of the turbulence regions 112, 114. Accordingly, the weather model analysis module 330 may cooperate with the weather information display module 332 to generate and display the turbulence region icons 112, 114 on the displayed radar image 402.

Furthermore, the weather model analysis module 330 may, based upon analysis of the weather models 336 corresponding to the detected storm cells 108, 110, be able to predict severity levels of the turbulence regions 112, 114. The turbulence severity levels are then indicated to the crew in a suitable manner, such as on the displayed radar image 402. Here, the turbulence region icon 112 is displayed as a relatively light-shaded icon to indicate that the turbulence region 112 is not particularly severe, and is therefore predicted to be non-hazardous. In contrast, the turbulence region 114 is predicted to have a relatively high intensity that may pose a potential hazard to the aircraft 104. Thus, the displayed radar image 402 may display the turbulence region icon 114 in a manner that indicates that the turbulence region 114 is predicted to be hazardous.

The turbulence region icons 112, 114 may be displayed using any suitable scheme, including a predefined color, fill, shading and/or intensity. An optional alpha-numeric text message (not shown) may be presented on the radar image 402.

Furthermore, the weather model 336 that is suitable for analyzing the storm cell 110 (which lies above the relatively high elevation mountain 118) may be used to predict a severe area of precipitation, lightning, and/or hail that may present a potential hazard to the aircraft 104. Accordingly, the weather model analysis module 330 and the weather information display module 332 cooperatively generate and display the weather icon 404 on the displayed radar image 402. The weather icon 404 indicates the predicted region of weather that may be potentially hazardous to the aircraft 104.

As noted above, weather models 204 in the weather model development system 202 (FIG. 2) are created or updated based upon weather information collected in the field. That is, as an aircraft 104 (FIG. 1) traverses through various types of weather, or is in proximity to the weather, the weather information is collected and saved into the observed weather information database 346 (FIG. 3), or is saved into another suitable memory media.

For example, as the aircraft's weather radar system 310 begins to come within range of the weather of interest, the process of collecting weather information is initiated for that weather event. That is, a trigger event corresponds to the presence of some type of weather of interest and initiates a process whereby weather information is collected by the aviation electronics system 302 and saved into the weather information database 346 for later analysis by the weather model development system 202.

In an exemplary embodiment, a trigger event may be based on the intensity of radar returns detected by the antenna 320. For example, but not limited to, weather reflectivity having an intensity value greater than a threshold may be used as a trigger event. Other radar intensity based trigger events may be used. If the value of the radar return intensity exceeds the threshold value in a predefined threshold number of range bins, then the process of collecting weather information may automatically be initiated. Further, the radar return intensity may need to remain above the intensity threshold for a predefined time period. Additionally, or alternatively, the detected radar return intensities may need to be within a certain threshold range of the aircraft, and/or the detected radar return intensities need to span a threshold distance (width or depth). If the value of the radar return intensity exceeds one or more to the trigger event criteria, then the process of collecting weather information is automatically initiated.

In another embodiment, collection of weather information may be initiated in response to a predefined trigger event. For example, in the event of a sudden, abrupt vertical acceleration detected by the onboard IMU 308. The sudden, abrupt vertical acceleration is indicative of turbulence. Thus, the acceleration information from the IMU 308, along with radar return information, is saved for later analysis. As noted above, the various applicable weather models 204 (FIG. 2) may be updated or modified based upon the later analysis of the collected information.

Other trigger events may include detection of lightning, hail, snow, and/or icing. Wind shear may also be used as a trigger when a detected wind shear exceeds a threshold wind shear. Alternatively, or additionally, the process of collecting weather information may be manually initiated by the crew of the aircraft 104 via the user interface 318. That is, the weather information is stored in response to receiving a manual event trigger from the crew of the airborne aircraft 104.

In some embodiments, weather information collected by the aviation electronics system 302 is stored into the weather information data base 346 on an ongoing real time basis. In the event that a trigger event is not received within a predefined data storage time threshold, the stored weather information is discarded, deleted, overwritten, or otherwise not further stored. If a trigger event is received, then the previously stored weather information is permanently saved. Thus, when a trigger event occurs, a time period immediately preceding the trigger event is available for analysis.

Storing the weather information collected by the aviation electronics system 302 continues for the duration of the event. Different criteria may be used to base duration of the recorded event. For example, the same turbulence threshold, or a lower turbulence threshold, can be used to identify the end of the weather event. Alternatively, or additionally, the crew may manually signal the end of the weather event, via the user interface 318. Other criteria may include changes in radar return intensities, or detection of the end of the lightning, the hail, the snow and/or the icing.

In some embodiments, upon conclusion of the weather event, recording of the weather information continues for some predetermined period of time. Thus, weather information pertaining to a period of time after the weather event has ended is available for later analysis.

The above-described trigger event thresholds may be saved in the weather model database 334 or in another suitable location of memory 316. Thus, as the weather models 334 become more refined as more observed weather information is analyzed over time, the trigger event threshold values may be updated so that more meaningful weather information is collected by the aircraft 104.

In some embodiments, the crew observing the weather may input their own observations as weather information via the user interface 318. For example, there may be an observable aspect of the weather that is not detectable by the aviation electronics system 302, such as the color of the weather. In some embodiments, captured images of the observed weather may also be saved as weather information.

At some point, the weather information saved into the observed weather information data base 346 of the aircraft 104 is transferred to the remote weather information data base 238 of the weather model development system 202 (FIG. 2). In some embodiments, the weather information is transferred to a suitable temporary remote memory medium, such as a data compact disk (CD), a floppy disk, a memory zip drive, or the like. These temporary remote medium may be mailed or otherwise delivered to the site of the weather model development system 202. Then, the weather information it transferred to the remote weather information data base 238 of the weather model development system 202 via the data interface 206.

Alternatively, or additionally, a suitable data connector may be available at the airport gate where the aircraft has taxied to after conclusion of its flight. The data connector could be coupled to a corresponding data port on the aircraft 104 such that the weather information can be electronically transferred out of the observed weather information data base 346 to a remote memory. The weather information could then be saved on a suitable remote memory medium, and/or may be transferred directly to the remote weather model development system 202 via the LAN 242, the Internet 244, or the PSTN 246.

In some embodiments, the weather information is wirelessly transferred out of the observed weather information data base 346. The weather information could then be saved on a remote memory medium, and/or may be transferred directly to the remote weather model development system 202 via the LAN 242, the Internet 244, or the PSTN 246.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for recording weather information for weather encountered by an airborne aircraft, the method comprising:
generating a trigger event corresponding to the presence of weather of interest having at least one characteristic greater than a threshold;
storing weather information collected by an aviation electronics system in a memory in response to generating the trigger event; and
downloading the stored weather information to a remote memory.

2. The method of claim 1, wherein generating the trigger event comprises:
receiving radar returns from weather in proximity to the airborne aircraft;
generating radar return intensity information based upon the received radar returns; and
comparing the generated radar return intensity information with a radar return intensity threshold,
wherein the weather information is stored in response to the radar return intensity information exceeding the radar return intensity threshold.

3. The method of claim 2, further comprising:
storing the radar return intensity information in a plurality of range bins, wherein each range bin uniquely corresponds to a unique location from the airborne aircraft; and
counting the number of range bins with radar return intensity information exceeding the radar return intensity threshold,
wherein the weather information is stored in response to the number of range bins with the radar return intensity information exceeding the radar return intensity threshold exceeding a predefined range bin threshold.

4. The method of claim 1, wherein generating the trigger event comprises:
determining at least one dimension of the weather; and
comparing the at least one dimension of the weather with a corresponding dimension threshold,
wherein the weather information is stored in response to the at least one dimension of the weather exceeding a weather dimension threshold.

5. The method of claim 4, wherein the at least one dimension of the weather comprises at least one selected from a group consisting of a width of the weather, a height of the weather, and a depth of the weather.

6. The method of claim 1, wherein generating the trigger event comprises:
determining at least one characteristic of the weather; and
comparing the at least one characteristic of the weather with a corresponding weather characteristic threshold,
wherein the weather information is stored in response to the at least one characteristic of the weather exceeding the weather characteristic threshold.

7. The method of claim 6, wherein the at least one characteristic of the weather comprises at least one selected from a group consisting of a presence of lightning, a presence of hail, and a presence of icing.

8. The method of claim 1, wherein generating the trigger event comprises:
sensing turbulence of the airborne aircraft; and
comparing the sensed turbulence with a corresponding turbulence threshold,
wherein the weather information is stored in response to the sensed turbulence exceeding the turbulence threshold.

9. The method of claim 1, wherein generating the trigger event comprises:
storing the weather information collected by the aviation electronics system in the memory for a predetermined time period before a time that the trigger event was received.

10. The method of claim 1, wherein generating the trigger event comprises:
storing the weather information collected by the aviation electronics system in the memory for a predetermined time period after a time that the trigger event has ended.

11. The method of claim 1, wherein the weather information is stored in response to receiving a manual trigger event from a crew of the airborne aircraft.

12. The method of claim 1, wherein downloading the stored weather information to a remote memory comprises:
storing the weather information on a portable memory; and transferring the weather information from the portable memory to the remote memory.

13. The method of claim 1, wherein downloading the stored weather information to the remote memory comprises:
wirelessly transferring the weather information to the remote memory.

14. The method of claim 1, wherein downloading the stored weather information to the remote memory comprises:
transferring the weather information to the remote memory over a communication system,
wherein the communication system comprises at least one selected from a group consisting of a local area network (LAN), the Internet, or a public switched telephony system (PSTN).

15. A weather information collecting system on an aircraft, comprising:
at least one weather sensor;
a processing system communicatively coupled to the at least one weather sensor, the processing system configured to determine weather information based upon weather detected by the weather sensor; and
an onboard memory that stores the determined weather information in response to a trigger event generated in response to the weather information exceeding a predefined threshold.

16. The weather information collecting system of claim 15, wherein the at least one weather sensor comprises:
a weather radar system configured to detect radar returns from the weather,
wherein the processing system determines radar return intensity values based on the radar returns, and
wherein the determined radar return intensity values are stored in the onboard memory in response to at least one of the determined radar return intensity values exceeding a predefined radar return intensity value threshold.

17. The weather information collecting system of claim 15, wherein the at least one weather sensor comprises:
an inertial measurement unit (IMU) configured to detect an acceleration of the aircraft when airborne,
wherein the processing system determines an acceleration value based on the sensed acceleration, and
wherein the determined acceleration value is stored in the onboard memory in response to an acceleration value exceeding a predefined acceleration value threshold.

18. The weather information collecting system of claim 15, further comprising:
a data interface communicatively coupled to the memory and configured to transfer the weather information stored in the onboard memory to a remote memory.

19. A weather information collecting system on an aircraft, comprising:
means for generating a trigger event corresponding to the presence of weather of interest; and
means for storing weather information collected by an aviation electronics system in a memory in response to receiving the trigger event; and
means for downloading the stored weather information to a remote memory.

20. The weather information collecting system of claim 19, wherein generating the trigger event comprises:
means for receiving radar returns from weather in proximity to the airborne aircraft;
means for generating radar return intensity information based upon the received radar returns; and
means for comparing the generated radar return intensity information with a radar return intensity threshold,
wherein the weather information is stored in response to the radar return intensity information exceeding the radar return intensity threshold.

* * * * *